United States Patent [19]

Chadwick et al.

[11] Patent Number: 4,728,704
[45] Date of Patent: Mar. 1, 1988

[54] PREPARATION OF SPHERICAL MAGNESIUM ALKOXIDE PARTICLES

[75] Inventors: John C. Chadwick; Jacob C. van der Sar, both of Amsterdam, Netherlands

[73] Assignee: Shell Oil Company, Houston, Tex.

[21] Appl. No.: 14,556

[22] Filed: Feb. 13, 1987

Related U.S. Application Data

[62] Division of Ser. No. 885,496, Jul. 14, 1986, Pat. No. 4,663,299.

[30] Foreign Application Priority Data

Aug. 28, 1985 [GB] United Kingdom ............... 8521431

[51] Int. Cl.$^4$ .................... C08F 4/02; C08F 10/06
[52] U.S. Cl. ........................ 526/124; 526/125
[58] Field of Search .......................... 526/124, 125

[56] References Cited

U.S. PATENT DOCUMENTS

| 3,362,940 | 1/1968 | Edwards et al. | 260/88.2 |
| 4,115,319 | 9/1978 | Scata et al. | 252/429 B |
| 4,136,243 | 1/1979 | Appleyard et al. | 526/139 |
| 4,220,554 | 9/1980 | Scata et al. | 252/429 B |
| 4,311,817 | 1/1982 | Morita et al. | 526/124 |
| 4,400,302 | 8/1983 | Goodall et al. | 252/429 B |
| 4,414,132 | 11/1983 | Goodall et al. | 502/169 |
| 4,465,783 | 8/1984 | McKenzie | 502/105 |
| 4,533,707 | 8/1985 | McKenzie | 526/125 |
| 4,535,068 | 8/1985 | Job | 502/107 |

FOREIGN PATENT DOCUMENTS 1554340 6/1977 United Kingdom .

Primary Examiner—Edward J. Smith

[57] ABSTRACT

A process for preparing spherical particles of a compound with the general formula $Mg(OR)_{2-a}(OR')_a$ is disclosed. In the process R is an alkyl group with from 2 to 8 carbon atoms, R' is an alkyl group with from 1 to 7 carbon atoms and a is a number of from 0 to 0.5. The process comprises preparing a homogeneous solution of a compound $Mg(OR)_2$ in an aliphatic alcohol with the general formula R'OH, spray-drying the solution at a temperature of from 15° to 85° C., suspending the spray-dried solid particles in an aliphatic alcohol with the formula ROH in which R is the same alkyl group as present in the said compound $Mg(OR)_2$, heating the suspension in order to remove an alcohol with the formula R'OH from the liquid phase by distillation and separating the solid particles from the liquid phase.

5 Claims, No Drawings

PREPARATION OF SPHERICAL MAGNESIUM ALKOXIDE PARTICLES

This is a division of application Ser. No. 885,496 filed July 14, 1986, now U.S. Pat. No. 4,663,299.

FIELD OF THE INVENTION

This invention is concerned with a process for the preparation of spherical particles of a compound with the formula $Mg(OR)_{2-a}(OR')_a$ in which R is an alkyl group with from 2 to 8 carbon atoms, R' is an alkyl group with from 1 to 7 carbon atoms and a is a number of from 0 to 0.5.

BACKGROUND OF THE INVENTION

It is known to use certain magnesium dialkoxides as starting materials for the preparation of solid catalyst components for olefin polymerization, see for example U.S. Pat. No. 4,414,132, GB No. 1,554,340 and FR No. 2,324,652. Such preparation methods proceed via halogenation of the dialkoxide to form a magnesium dihalide by reaction with a suitable halogenating agent such as benzoylchloride, thionylchloride or titanium tetrachloride, and incorporation of an electron donor, e.g. ethyl benzoate. When halogenating agents other than a titaniumhalide are employed a further contacting with titanium halide ensures incorporation of the latter into the solid catalyst component in the required amount, usually 2 to 4.5% wt of titanium per gram of solid component.

Olefin polymerization catalyst components so produced can be satisfactory in terms of polymerization activity (polymer yield) and stereospecific performance (polymer isotactics content), however, a third important polymerization criterion, i.e. polymer morphology, leaves much room for improvement. In olefin polymerization polymer morphology is known to be a replica of catalyst morphology, and the Applicants have found that in catalyst components obtained from magnesium dialkoxides, the morphology of the catalyst component can be governed by the morphology of magnesium dialkoxide starting material. So, if one seeks to employ optimal catalyst morphology comprising spherical particles ideally, 5 to 25 micron diameter, it is desirable to avail of magnesium dialkoxide starting material having the same morphology.

While various grades of magnesium dialkoxides are available on the market, there is today no such commercial material having the desired optimal morphology. Applicants seek to provide a process for converting magnesium dialkoxides of whatever particle size or shape into spherical particles. It has already been proposed to achieve this by dispersing solid magnesium dialkoxide particles into a suitable liquid phase and to spray-dry the dispersion, c.f. DE 2,839,188. However, the spray-drying of dispersions is not attractive as the dispersed solid particles will tend to clog the fine orifices of the spray-drying equipment and to foul the pumping and metering systems.

SUMMARY OF THE INVENTION

In accordance with the invention a process is provided for preparing spherical particles of a compound with the general formula $Mg(OR)_{2-a}(OR')_a$ in which R is an alkyl group with from 2 to 8 carbon atoms, R' is an alkyl group with from 1 to 7 carbon atoms and a is a number of from 0 to 0.5, which process comprises preparing a homogeneous solution of a compound $Mg(OR)_2$ in an aliphatic alcohol with the general formula R'OH, spray-drying the solution at a temperature of from 15° to 200° C., suspending the spray-dried solid particles in an aliphatic alcohol with the formula ROH in which R is the same alkyl group as contained in the aforesaid compound $Mg(OR)_2$, heating the suspension in order to remove an alcohol with the formula R'OH from the liquid phase by distillation and recovering the solid particles from the liquid phase.

An important key to the process of the present invention is the finding that during the spray-drying there occurs a chemical reaction involving exchange of groups OR contained in the magnesium compound by groups OR' contained in the R'OH solvent:

$$Mg(OR)_2 + nR'OH \rightarrow Mg(OR)_{2-n}(OR')_n + nROH$$

In the spray-dried product n represents a number of from 0.1 to 1.9, dependent upon the exchangeability of the groups OR and OR' and on the main conditions employed for spray-drying, particularly concentration and temperature.

When the spray-dried solid is dispersed in the alcohol ROH there occurs a second exchange reaction along:

$$Mg(OR)_{2-n}(OR')_n + mROH \rightarrow Mg(OR)_{m+2-n}(OR')_{n-m} + mR'OH$$

in which m can be a number up to n.

Both reactions can be represented by the single equilibrium:

$$Mg(OR)_2 + nR'OH \rightleftharpoons Mg(OR)_{2-n}(OR')_n + nROH.$$

This equilibrium is shifted to the right in the solution used for spray-drying and during the spray-drying operation and it is shifted to the left by distilling-off the alcohol R'OH in the operation following spray-drying. The latter alcohol must therefore be more volatile than the alcohol ROH.

Thus in the case where R is ethyl and R' is methyl the spray-drying operation results in the formation of a mixed ethoxide-methoxide-magnesium compound $Mg(OC_2H_5)_{2-n}(OCH_3)_n$ and the distilling-off of $CH_3OH$ from the solution in ethanol converts the mixed alkoxide compound back into $Mg(OC_2H_5)_2$ or at least into a mixed alkoxide containing far less methoxy groups than are contained in the spray-dried product. The distilling-off operation does not alter the spherical shape nor the size of the suspended particles.

DETAILED DESCRIPTION OF THE INVENTION

Preferred temperatures for spray-drying are from 30° to 70° C. The pressure will usually be atmospheric, although subatmospheric pressures may be employed as well. Conventional spray-drying equipment may be employed. Nozzle-orifices are adjusted to produce particles ideally having a diameter in between 5 and 30 microns, preferably from 10 to 18 microns.

The groups R and R' in the alcohols and the magnesium compound preferably have up to six carbon atoms. Suitable groups are methyl, ethyl, n-propyl, iso-propyl, n-amyl, iso-amyl, iso-butyl, 3-methylpentyl and the like. Methyl and ethyl groups are most preferred. The most preferred groups OR are ethoxy groups and the most preferred alcohol R'OH is methanol.

An important application of the spherical particles obtained with the process of this invention is their use as starting material for the preparation of solid olefin polymerization catalyst components. While in principle any prior art process can be employed to achieve this purpose, a preferred process comprises halogenating the spherical Mg-alkoxide particles by reaction with a halide of tetravalent titanium in the presence of a halohydrocarbon and an electron donor. This halogenation is optionally preceded by converting the spherical Mg-alkoxide particles into a compound with the formula $Mg(OR)_{2-b}X_b$, in which b is a number of from 0.3 to 1.8, preferably of from 0.5 to 1.5, and X is halogen, preferably chlorine, by reacting with a halogenating agent other than a titaniumhalide, preferably thionylchloride.

In the halogenation with a halide of tetravalent titanium, the magnesium compounds are preferably reacted to form a magnesium halide in which the atomic ratio of halogen to magnesium is at least 1.5. Better results are obtained when the halogenation proceeds more completely, i.e., yielding magnesium halides in which the atomic ratio of halogen to magnesium is at least 1.8. The most preferred reactions are those leading to fully halogenated reaction products. Such halogenation reactions are suitably effected by employing a molar ratio of magnesium compound to titanium compound of from 0.005:1 to 2:1, preferably from 0.01:1 to 1:1. These halogenation reactions are conducted in the additional presence of an halohydrocarbon and an electron donor. An inert hydrocarbon diluent or solvent may also be present. When using an inert diluent or solvent, this should of course not be used as a complete substitute for the halohydrocarbon.

Suitable halides of tetravalent titanium include aryloxy- or alkoxy-di- and -trihalides, such as dihexanoxy-titanium dichloride, diethyoxy-titanium dibromide, isopropoxy-titanium tri-iodide and phenoxy-titanium trichloride; titanium tetrahalides are preferred; most preferred is titanium tetrachloride.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,3-trichloroethane are preferred aliphatic halohydrocarbons. Aromatic halohydrocarbons may also be employed, e.g., chlorobenzene, bromobenzene, dichlorobenzene, dichlorodibromobenzene, naphtyl chloride, chlorotoluene, dicholorotoluenes, and the like; chlorobenzene and dichlorobenzene are preferred aromatic halohydrocarbons. Chlorobenzene is the most preferred halohydrocarbon.

The above halogenation procedure, which is known from U.S. Pat. No. 4,414,132, normally proceeds under formation of a solid reaction product which may be isolated from the liquid reaction medium by filtration, decantation or another suitable method and may be subsequently washed with an inert hydrocarbon diluent, such as n-hexane, iso-octane or toluene, to remove any unreacted material, including physically absorbed halohydrocarbon.

Suitable electron donors used in the preparation of the solid catalyst component by the disclosed halogenation procedure are ethers, esters, ketones, phenols, amines, amides, imines, nitriles, phosphines, phospites, stibines, arsines, phosphoramides and alcoholates. Examples of suitable donors are those referred to in U.S. Pat. No. 4,136,243 or its equivalent GB No. 1,486,194 and in GB No. 1,554,340. Suitable donors are for example ethyl and methyl benzoate, p-ethoxy methyl benzoate, ethyl acetate, diisobutyl phthalate, dimethyl carbonate, dimethyl adipate, dihexyl fumarate, dibutyl maleate, p-chloro ethyl benzoate, p-amino hexyl benzoate, isopropyl naphthenate, n-amyl toluate, 1,2,4-trimethyl piperazine, 2,3,4,5-tetramethyl piperidine and similar compounds. Preferred electron donors for use in preparing the titanium constituent are alkylesters of aromatic carboxylic acids, most preferably ethyl benzoate and p-methyl toluate, p-methoxy ethylbenzoate, p-ethoxy ethylbenzoate and diisobutyl phthalate.

When preparing the solid catalyst component with preceding conversion of Mg-alkoxide into Mg-alkoxyhalide, any of the halogenating agents and any of the operations disclosed in GB No. 1,550,195 may be employed. A preferred halogenating agent is thionyl chloride. The applicants have found that by preceding halogenation with $SOCl_2$, solid catalyst components are eventually obtained which when used in stereospecific olefin-polymerization, produce polymers with a significantly improved morphology, in particular, very high polymer bulk densities may be achieved. Halogenation with thionylchloride is preferably operated to produce a compound with the formula $Mg(OR)_{2-b}X_b$ in which b varies of from 0.8 to 1.2. In the latter formula a minor amount of groups OR may have been replaced by groups OR'.

Further improvements in the activity and stereospecific performance of the solid catalyst components produced by any of the aforesaid operations, is obtained when they are subjected to a subsequent reaction with titanium tetrachloride at a temperature of from 60° to 130° C. This treatment may be carried out in the additional presence of an organic acid halide, preferably benzoylchloride. This improvement is known from EP No. 19,330 and EP No. 135,973.

The solid catalyst component is used for olefin polymerization in conjunction with an organoaluminum compound, which may be complexed with an electron donor chosen from those listed hereinbefore.

While aluminum trialkyl compounds, dialkylaluminum halides and dialkylaluminum alkoxides may be used, aluminumtrialkyl compounds are preferred, particularly those wherein each of the alkyl groups has 2 to 6 carbon atoms, e.g., aluminumtriethyl, aluminumtri-n-propyl, aluminumtri-isobutyl, aluminumtri-isopropyl and aluminumdibutyl-n-amyl. Excellent results are obtained when employing aluminumtriethyl and diethylaluminumchloride.

To prepare the final polymerization catalyst composition, solid catalyst component, cocatalyst and electron donor selectivity control agent may be simply combined, most suitably employing a molar ratio to produce in the final catalyst system an atomic ratio of aluminum to titanium of from 10:1 to 150:1. The catalysts of this invention tend to exhibit very good activity at low Al:Ti ratios, i.e., below 80:1.

Polymerization of propylene as sole olefin feed or in combination with small amounts, e.g., from 1 to 10 mole percent, of ethylene, 1-butene or other alpha olefin comonomer, may be conducted with the catalysts systems of this invention in a liquid system with an inert diluent such as a paraffinic liquid of 3 to 15 carbon atoms per molecule, or in a liquid system containing propylene as sole diluent or together with a small amount of propane, or in vapor phase. Propylene polymerization in liquid phase is conducted at temperatures of 50° to 80° C. and at a pressure sufficient to maintain liquid conditions.

In propylene polymerization, the reaction mixture is typically maintained at conditions at which the polymer is produced as a slurry of powder in the reaction mixture. The catalyst systems of this invention are extremely active and highly stereoselective in propylene polymerization, so that no removal of catalyst components or of atactic polymer from the polymer product is required.

Olefin polymerization may also be conducted as a solution process in which the polymer is produced as a solution in monomer or diluent. Such a process is preferred in the polymerization of 1-butene as described, for example, in U.S. Pat. No. 3,362,940.

EXAMPLE 1

(a) Spray-drying

Methanol (2500 ml) was added under an atmosphere of nitrogen to magnesium ethoxide (ex. Dynamit Nobel, 210 g) with stirring at −40° C. The temperature was allowed to rise to room temperature with continued stirring, after which the mixture was left standing to allow undissolved solid to settle out. The clear solution so obtained was spray-dried using a spray drier having a cylindrical drying chamber 70 cm long and 15 cm in diameter. Flow rates of sample solution and nitrogen through the spray set up were 8 ml/min and 500 Nl/h respectively. Drying was effected using a cocurrent flow of nitrogen (13 m$^3$/h), preheated to 60° C., through the spray drier. The product was collected in a cyclone. It had the composition $Mg(OCH_3)_{1.8}(OC_2H_5)_{0.2}$ and was in the form of spherical particles having an average diameter in the range of 8 to 10 micrometers.

(b) Methanol flashing

The above spray-dried product (26.1 g) was dispersed in 2500 ml ethanol and from the resulting slurry methanol was flashed off at a temperature in the range of from 85° to 125° C. The particle size and morphology of the product remained unchanged, while the increase in ethoxide group content was evidenced by the composition $Mg(OC_2H_5)_{1.8}(OCH_3)_{0.2}$.

(c) Catalyst component preparation

Titanium tetrachloride (35 ml) was added to a stirred mixture of the above product (b) (1.0 g), along with ethyl benzoate (0.5 ml) and chlorobenzene (30 ml), keeping the temperature of the mixture at 20°–30° C. The temperature was subsequently raised to 100° C. over a period of 15 min. After stirring at 100° C. for 1 h, the solid obtained was allowed to settle over a period of 50 min and the liquid components were removed by decantation. TiCl$_4$ (50 ml) was added and the mixture was stirred for 30 min at 100° C. and then allowed to stand at this temperature for 20 min before decantation. The remaining solid was again treated with TiCl$_4$ under the same conditions and then washed with 9×50 ml isooctane at 50°–70° C. before drying with nitrogen. The solid catalyst component so produced had a titanium content of 3.2% wt.

(d) Polymerization

The above solid catalyst component (27 mg) was introduced into a 6 liter autoclave containing 2 kg liquid propylene at 52° C., to which triethylaluminum (AlEt$_3$) and p-ethoxy ethylbenzoate had been added as solutions in isooctane (approx. 100 ml) in quantities such that the molar ratios AlEt$_3$/Ti and AlEt$_3$/p-ethoxy ethylbenzoate were 80:1 and 1.3:1 respectively. The temperature was raised to 67° C. over a period of 5 min and polymerization continued at 67° C. for 1 h. Unreacted propylene was removed by evaporation and the polymer was dried. The yield of polymer was 18.9 kg per gram solid catalyst used and xylene solubles content of the polymer (the percentage of material remaining soluble when cooling a solution of polymer in xylene from its boiling point to 25° C.) was 4.6% wt. The particle morphology of the polymer was essentially spherical and the bulk density was 0.37 g/ml.

EXAMPLE 2

1.14 g of the product obtained in Example 1b was mixed with isooctane (40 ml) at room temperature and a solution of thionyl chloride (0.07 ml) in isooctane (24 ml) was added with stirring. The resulting mixture was stirred at 55° C. for 1 h and subsequently at 85° C. for 1 h under a stream of nitrogen before allowing to stand. The solid product was isolated by decantation and washed with 3×50 ml isooctane. The chloro-Mg-alkoxide product was reslurried in chlorobenzene (40 ml) and ethyl benzoate (0.6 ml). Titanium tetrachloride (30 ml) was then added and catalyst preparation was continued under the conditions described in Example 1c to yield a solid catalyst component containing 3.1% wt Ti.

Polymerization was carried out under the same conditions as described in Example 1d, resulting in a polymer yield of 19.2 kg per gram solid catalyst and a xylene solubles content of 5.2% wt. The particle form of the polymer was again essentially spherical and the bulk density was 0.42 g/ml.

What is claimed is:

1. A process for polymerizing olefins which comprises:
   (a) first preparing spherical particles of a compound with the general formula $Mg(OR)_{2-a}(OR')_a$ in which R is an alkyl group with from 2 to 8 carbon atoms, R' is an alkyl group with from 1 to 7 carbon atoms and a is a number of from 0 to 0.5 which process comprises:
      (i) preparing a homogeneous solution of a compound $Mg(OR)_2$ in an aliphatic alcohol with the general formula R'OH.
      (ii) spray-drying the resulting solution at a temperature of from 15° to 85° C. therein forming solid particles,
      (iii) suspending the spray-dried solid particles in an aliphatic alcohol with the formula ROH in which R is the same alkyl group as present in the said compound $Mg(OR)_2$,
      (iv) heating the resulting suspension in order to remove an alcohol with the formula R'OH from the liquid phase by distillation, and
      (v) separating the solid particles from the liquid phase,
   (b) halogenating the spherical particles produced in (a) with a halide of tetravlaent titanium in the presence of a halohydrocarbon and an electron donor, the halogenation optionally being preceding by converting the spherical Mg-alkoxide particles into a compound with the formula $Mg(OR)_{2-b}X_b$, in which b is a number of from 0.3 to 1.8 and X is halogen, by reacting with a halogenating agent other than a titaniumhalide, and (c) contacting the halogenated spherical particles with at least one alpha olefin having at least 3 carbon atoms in the presence of an organoaluminum compound.

2. The process of claim 1 in which the alkyl group R is ethyl and the alkyl group R' is methyl.

3. The process of claim 1, in which the spray-drying is carried out at a temperature of from 30° to 70° C.

4. The process of claim 1 in which the electron donor is an alkylester of an aromatic carboxylic acid.

5. The process of claim 1 in which the catalyst component is subject to a subsequent reaction with titanium tetrachloride at a temperature of from 60° to 136° C., optionally in the presence of an organic acid halide.

* * * * *